United States Patent
Burges et al.

(10) Patent No.: US 7,472,096 B2
(45) Date of Patent: Dec. 30, 2008

(54) TRAINING A LEARNING SYSTEM WITH ARBITRARY COST FUNCTIONS

(75) Inventors: Christopher J. Burges, Bellevue, WA (US); Yevgeny E. Agichtein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/305,395

(22) Filed: Dec. 16, 2005

(65) Prior Publication Data

US 2007/0094171 A1 Apr. 26, 2007

Related U.S. Application Data

(60) Provisional application No. 60/700,080, filed on Jul. 18, 2005.

(51) Int. Cl.
*G06F 15/18* (2006.01)
*G06K 9/00* (2006.01)

(52) U.S. Cl. .................... 706/20; 382/159; 382/181

(58) Field of Classification Search .............. 706/20; 382/159, 181
See application file for complete search history.

(56) References Cited

U.S. PATENT DOCUMENTS

| | | | |
|---|---|---|---|
| 5,625,751 A | 4/1997 | Brandwajn et al. | |
| 6,260,013 B1 | 7/2001 | Sejnoha | |
| 6,526,440 B1 | 2/2003 | Bharat | |
| 7,281,002 B2 | 10/2007 | Farrell | |
| 2003/0236662 A1* | 12/2003 | Goodman | .................. 704/224 |
| 2005/0049990 A1 | 3/2005 | Milenova et al. | |
| 2005/0144158 A1 | 6/2005 | Capper et al. | |

OTHER PUBLICATIONS

Jarvelin et al, "Cumulated Gain-Based Evaluation of IR Techniques", 2002.*
Storn et al., "Differential Evolution—A Simple and Efficient Heuristic for Global Optimization over Continuous Spaces", 1996.*
Xia et al., "A One-Layer Recurrent Neural Network for Support Vector Machine Learning", 2004.*
Cohen et al, "Volume Seedlings", 1992.*
Storn, "On the Usage of Differential Evolution for Function Optimization", 2002.*
Storn, et al., "Differential Evolution—A Simple and Efficient Heuristic for Global Optimization over Continuous Spaces", 1996.
Xia, et al., "A One-Layer Recurrent Neural Network for Support Vector Machine Learning", 2004.

(Continued)

*Primary Examiner*—David R Vincent
*Assistant Examiner*—Nathan H Brown, Jr.
(74) *Attorney, Agent, or Firm*—Amin, Turocy & Calvin, LLP

(57) ABSTRACT

The subject disclosure pertains to systems and methods for training machine learning systems. Many cost functions are not smooth or differentiable and cannot easily be used during training of a machine learning system. The machine learning system can include a set of estimated gradients based at least in part upon the ranked or sorted results generated by the learning system. The estimated gradients can be selected to reflect the requirements of a cost function and utilized instead of the cost function to determine or modify the parameters of the learning system during training of the learning system.

19 Claims, 12 Drawing Sheets

OTHER PUBLICATIONS

Cohen, et al., "Volume Seedlings", 1992.

Jarvelin, et al., Cumulated Gain-Based Evaluation of IR Techniques, 2002.

International Search Report and Written Opinion dated Mar. 6, 2008 for PCT Application Serial No. PCT/US06/26266, 11 Pages.

Joachims. "Optimizing Search Engines using Clickthrough Data" ACM SIGKDD 02, Edmonton, Alberta, Canada. pp. 133-142. Last accessed Jun. 26, 2008, 10 pages.

OA dated Jun. 26, 2008 for U.S. Appl. No. 11/378,086, 27 pages.

G. S. Kimeldorf, et al., "Some results on Tchebycheffian Spline Functions" J. Mathematical Analysis and Applications, 1971, vol. 33, pp. 82-95.

C. Burges, et al, "Learning to Rank Using Gradient Descent", Proceedings of the 22nd international conference on Machine learning, ACM International Conference Proceeding Series; 2005, pp. 89-96, vol. 119, Bonn, Germany.

C. Burges, "Ranking as Learning Structured Outputs", in Proceedings of the NIPS 2005 Workshop on Learning to Rank, Dec. 2005, 4 pages.

B. Scholkopf, et al., "Learning with Kernels", MIT Press, 2002, pt. 1, 100 pages (front cover-80).

B. Scholkopf, et al., "Learning with Kernels", MIT Press, 2002, pt. 2, 100 pages (81-180).

B. Scholkopf, et al., "Learning with Kernels", MIT Press, 2002, pt. 3, 100 pages (181-280).

B. Scholkopf, et al., "Learning with Kernels", MIT Press, 2002, pt. 4, 100 pages (281-380).

B. Scholkopf, et al., "Learning with Kernels", MIT Press, 2002, pt. 5, 100 pages (381-480).

B. Scholkopf, et al., "Learning with Kernels", MIT Press, 2002, pt. 6, 100 pages (481-580).

B. Scholkopf, et al., "Learning with Kernels", MIT Press, 2002, pt. 7, 49 pages (581-back cover).

Freund, et al. "An Efficient Boosting Algorithm for Combining Preferences" (1999) 9 pages.

Bromley, et al. "Signature Verification Using 'Siamese' Time Delay Nural Network." (1993) Advances in Pattern Recognition Systems Using Neural Network Technologies, World Scientific, pp. 25-44.

Burges, C. "Simplified Support Vector Decision Rules" (1996) International Conference on Machine Learning, pp. 71-77.

Dekel, et al. "Log-linear Models for Label-ranking" (2004) NIPS, 8 pages.

Harrington, E. "Online ranking/collaborative filtering Using Perceptron Algorithm" (2003) ICNL, 8 pages.

Hastie, et al. "Classification by Pairwise Coupling" (1998) NIPS, pp. 451-471.

Jarvelin, et al. "IR Evaluation Methods for Retrieving Highly Relevant Documents" (2000) Proceedings of the 23rd annual ACM SIGIR, pp. 41-48.

Mason, et al. "Boosting Algorithms as Gradient Descent" (2000) NIPS 7 pages.

Caruana, et al. "Using the Future to 'Sort Out' the Present: Rankprop and Multitask Learning for Medical Risk Evaluation" (1996) NIPS, pp. 959-965.

Crammer, et al. "Pranking with Ranking" (2001) NIPS, 7 pages.

Baum, et al. "Supervised Learning of Probability Distributions by Neural Networks" (1988) Neural Information Processing Systems, pp. 52-61.

Orr, et al. "Neural Networks: Tricks of the Trade", Springer, 1998.

Refregier, et al. "Probabilistic Approach for Multiclass Classification with Neural Networks" (1991) Proceedings of the 1991 International Conference on Artificial Neural Networks (ICANN-91) 5 pages.

Herbrich, et al. "Large Margin Rank Boundaries for Ordinal Regression" (2000) Advances in Large Margin Classifiers, pp. 115-132.

Mitchell. "Machine Learning" New York: McGraw-Hill, 1997.

* cited by examiner

TRAINING A LEARNING SYSTEM WITH ARBITRARY COST FUNCTIONS

CROSS-REFERENCE TO RELATED APPLICATIONS

This is an application claiming benefit under 35 U.S.C. 119(e) of U.S. Provisional Patent application Ser. No. 60/700, 080 entitled "TRAINING RANKING SYSTEMS WITH ARBITRARY COST FUNCTIONS" and filed Jul. 18, 2005. The entirety of the above-noted application is incorporated by reference herein. This application is also related to co-pending U.S. patent application Ser. No. 11/066,514, entitled, "SYSTEM AND METHOD FOR LEARNING RANKING FUNCTIONS ON DATA", filed Feb. 25, 2005 and U.S. patent application Ser. No. 11/378,086, entitled, "EFFICIENCY OF TRAINING FOR RANKING SYSTEMS", and filed Mar. 17, 2006.

BACKGROUND

The amount of data available to information seekers has grown astronomically, whether as the result of the proliferation of information sources on the Internet, or as a result of private efforts to organize business information within a company, or any of a variety of other causes. As the amount of available data has grown, so has the need to be able to sort and locate relevant data. A related problem is the need to rank data that has been identified as relevant.

When users search data collections for specific data, users typically desire more than a listing of results that simply have some relation to the search query entered by the users. The users generally want to be able to quickly locate the best or most relevant results from within the listing. Ranking the results of the search can assist users in quickly locating the most relevant data. Generally, a high ranking indicates to users that there is a high probability that the information for which the users searched is present in the search result.

One approach is to use machine learning systems to locate, sort, rank or otherwise process the data. Machine learning systems include such systems as neural networks, support vector machines ("SVMs") and perceptrons, among others. These systems can be used for a variety of data processing or analysis tasks, including, but not limited to, optical pattern and object recognition, control and feedback systems and text categorization. Other potential uses for machine learning systems include any application that can benefit from data classification or regression. Typically, the machine learning system is trained to improve performance and generate optimal search, sort or ranking results.

Such machine learning systems are usually trained using a cost function, which the learning process attempts to minimize. Often, however, the cost functions of interest are not minimized directly, since this has presented too difficult a problem to solve. For example, in document retrieval problems, one measure of quality of the trained system is the area under the Receiver Operating Curve (ROC) curve. The ROC curve is a graphical plot of the number of true positives (e.g., relevant documents retrieved), versus the number of false positives (e.g., irrelevant documents retrieved). Such cost functions are not differentiable functions of the outputs of the machine learning systems used, and this lack of smoothness presents difficulties for training using such functions directly.

SUMMARY

The following presents a simplified summary of one or more embodiments of a learning system training system and/or method in order to provide a basic understanding of some aspects of such embodiments. This summary is not an extensive overview, and is intended to neither identify key or critical elements of the embodiments nor delineate the scope of such embodiments. Its sole purpose is to present some concepts of the described embodiments in a simplified form as a prelude to the more detailed description that is presented later.

Briefly described, the systems and/or methods described herein provide for the training of machine learning systems. The systems described herein can include a set of estimated gradients based at least in part upon the structured data generated by the learning system and a cost function. The estimated gradients can be used instead of the cost function to determine or modify parameters of the machine learning system during training of the system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
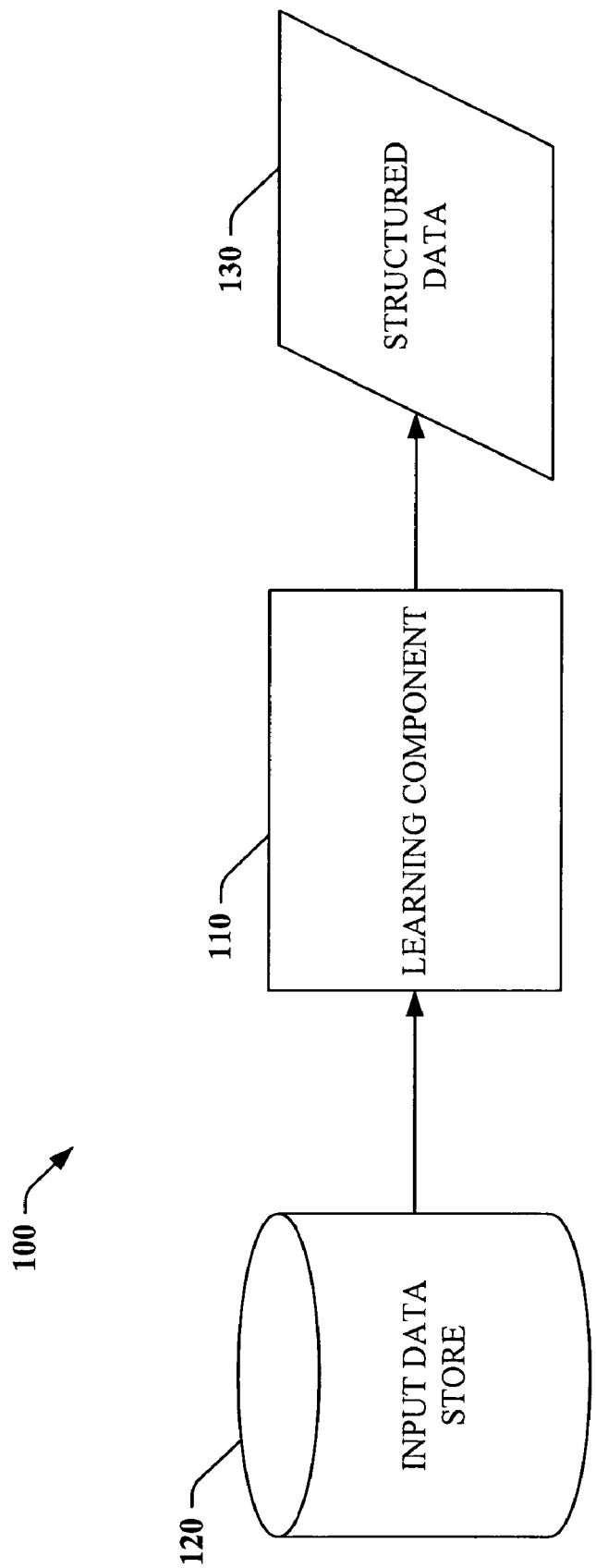
FIG. 1 is an illustration of a system for generating structured data in accordance with an aspect of the subject matter disclosed herein.

The various aspects of the subject matter disclosed herein are now described with reference to the drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the disclosed subject matter may be implemented as a system, method, apparatus or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Frequently, machine learning systems are used to process data. For example, machine learning systems can be used to perform information retrieval or rank data items. The term machine learning system is generally intended to refer to a computer-related entity, either hardware, a combination of hardware and software, software, or software in execution. For the purposes of this disclosure, the terms machine learning system and learning system will be used interchangeably. Generally, learning systems need to be trained to process the data according to the needs of the users. A variety of metrics, such as cost functions, can be used to evaluate learning system performance. Learning systems should be trained to optimize performance with respect to the metric or cost function that will be used to evaluate the learning system.

One use for such machine learning systems is to rank elements in data sets. A specific data set of interest is a set of web pages retrieved as a result of a search query formulated by a user. Within that data set, a user typically desires the web pages in the result to be ordered from the most likely to be responsive to his search request to the least likely. Web pages having the same likelihood of responsiveness (e.g., the same probability of a match with the query based upon certain criteria) should receive the same rank. For presentation to the user, ordering of web pages with the same rank may be arbitrary or may be based upon any appropriate scheme.

Another important use for the described systems is answering questions. In question answering, a ranked set of answers (e.g., strings or phrases) is returned as a result of a search query formulated by a user. The first answer returned should be the one most likely to be responsive to the question. The other members of the data set may be ignored completely or returned lower in the list. In this case, the metric or cost function measures only if the top-returned answer is correct.

It is to be understood that machine learning systems can be utilized to for a variety of uses beyond the ranking problem discussed here. In addition, it is to be understood that an unlimited number of additional query options exist. These alternative aspects are to be included within this scope of this disclosure and claims appended hereto. In other words, it is understood that the novel concepts and functionality described herein can be applied to an endless number of scenarios, each of which is to be included within spirit and scope of this disclosure and claims appended hereto.

FIG. 1 is an illustration of a system 100 for generating structured data in accordance with an aspect of the subject matter disclosed herein. As used herein, structured data can include ordered data, partially ordered data, graphs, sequences, strings, or the like. The system 100 can be used for ranking and/or sorting data or for information retrieval, but is not limited to such uses. The system 100 includes a learning component 110, an input data store 120 and a set of structured data 130. The learning component 110 can include any machine learning system that can be trained using gradient descent. The examples presented as part of this disclosure generally illustrate learning systems using neural networks to implement the learning component 110. However, artisans of ordinary skill in this area will recognize that other machine learning systems, including but not limited to, kernel learning method systems, Bayesian methods, and boosting methods, can be utilized in connection with the subject matter disclosed herein. Such artisans will also readily recognize that modifications may be made to specific examples presented in order to substitute other machine learning systems in place of a neural network as the learning component 110. The learning algorithm used for those learning systems should depend upon the gradients of the cost function. Although modifications of this type may be made, those modifications are simply implementation details and do not depart from the scope of the disclosed subject matter.

The input data store 120 contains data to be input into and processed by the learning component 110. A data store as used herein is any collection of data including, but not limited too, a database or collection of files, including text files, web pages, image files, audio data, video data, word processing files and the like. Data within the input data store 120 can be formatted in a suitable manner for use by the learning component 110. Alternatively, the learning component can include a formatting component (not shown) that renders the data in a format suitable for operation on by the learning component 110. In addition, the format of the data within the input data store 120 may vary based upon a mode or phase of operation of the learning component 110, such as a training phase, a testing phase or an operational phase.

The learning component 110 can process the data from the input data store 120 and output a set of structured data 130. The structured data 130 can be used by other components or presented to a user, or both. For example, the system can include a viewing component, not shown, which displays the structured data to users in any format useful to or desired by the users. An example of such structured data would include the result of a search for documents on a network as a response to a user's query (e.g., web pages on the Internet). A set of responsive documents may be presented to the learning component 110 as input data and ranked in an order based upon certain criteria before being presented to the user as structured data or in this example ranked search results.

In general, learning systems have multiple phases of operation. The initial phase is known as the training phase. During the training phase, a set of training data can be input into the learning system. The learning system learns to optimize processing of data during the processing of the training data. Next, a set of validation data can be input into the learning system. The results of processing of the validation data set by the learning system can be measured using a variety of evaluation metrics to evaluate the performance of the learning system. The learning system can alternate between the training and validation data to optimize system performance. Once the learning system achieves a desired level of performance, the parameters of the learning system can be fixed such that performance will remain constant before the learning system enters into the operational phase. During the operational phase, which typically follows both training and validation, users can utilize the learning system to process operational data and obtain the users' desired results.

Figure 2:
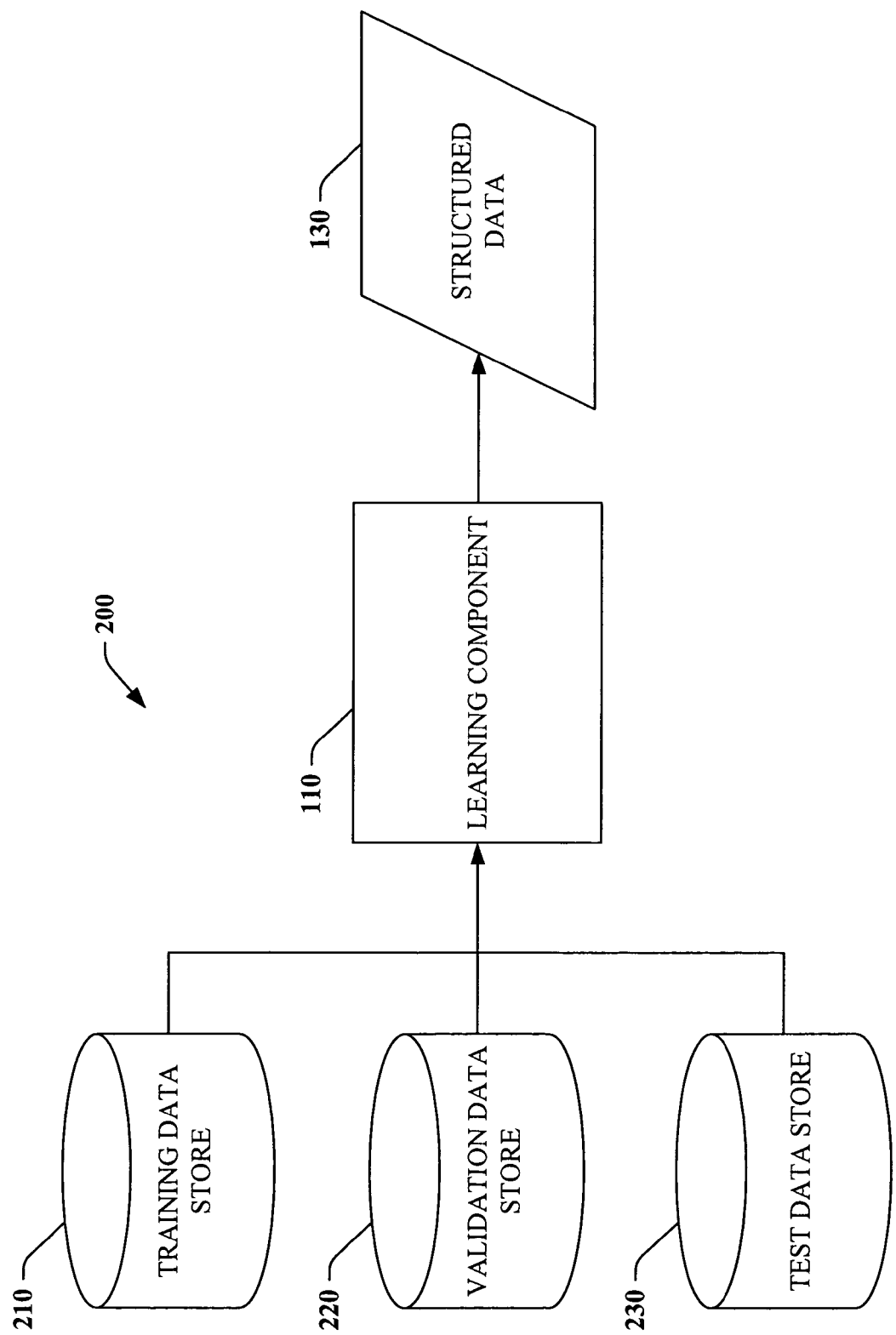
FIG. 2 is an illustration of a system for generating structured data in accordance with an aspect of the subject matter disclosed herein.

In a further aspect of the system for generating structured data illustrated in FIG. 2, the learning component 110 or machine learning system may receive data from separate data stores depending upon the mode or phase of operation. The learning component 110 can receive a data set specifically selected for training the learning system from a training data store 210 during the training phase. The learning component 110 can receive a validation data set from a validation data store 220. In addition, the learning component 110 can receive data from a separate test data store 230, during the operational phase.

The quality of the learning system results may be measured using a large variety of cost functions or evaluation metrics. One such metric is the mean reciprocal rank (MRR), which applies to the binary relevance task. For MRR, within the context of document retrieval, for a given query, any returned document is labeled as either "relevant" or "not relevant." If the rank of the highest ranking relevant document for a query is $r_i$, where i is the number or index of the query that returned the document, then the reciprocal rank measure for that query is the reciprocal of $r_i$ or $1/r_i$. The MRR is calculated as the average of the reciprocal rank measure over the set of queries.

Machine learning systems can also be evaluated using the normalized discounted cumulative gain measure ("NDCG"). NDCG, within the context of document retrieval, is a cumulative measure of ranking quality. Therefore, a suitable cost function would be one minus the NDGC. For a given query $Q_i$, NDCG, denoted her by $N_i$, can be computed using the following formula:

$$N_i \equiv N_i \sum_{j=1}^{L} (2^{r(j)} - 1)/\log(1 + j)$$

Here, r(j) is the relevance level of the document in position j in the ranked document order. The normalization constant, $N_i$, is chosen such that a perfect ordering of the documents would result in $N_i=1$. Here, L is the ranking level at which the NDCG is computed. The $N_i$ are averaged over the query set to calculate the NDCG.

Additional metrics include pair-wise error counts and winner-take-all ("WTA"). For pair-wise error counts in the context of document retrieval, the number of document pairs that are in the incorrect order are counted. Various modifications of this basic measure are used in information retrieval literature. For example, the pair-wise error can be computed as the number of incorrect document pairs over the maximum number of possible incorrect document pairs. The WTA function is frequently used to evaluate question answering where only the top answer is evaluated. Typically, question answering, credit is given only if the correct answer is in the top position of a list of ranked answers. No credit is given if the wrong answer is in the top position, even if the correct answer is in the second position within the list of ranked answers.

The three measures discussed above, MRR, NDCG and WTA, are but a small exemplary subset of the kinds of measures used by practitioners of retrieval and ranking methods. Additional metrics or cost functions include, but are not limited to, measurement of the area under the ROC curve and the mean average precision. This subset is used here for the purpose of clarifying the discussion with concrete examples. As such, these measures are not intended to limit the scope of the innovation in any way.

Frequently, learning systems have utilized approximations of the cost functions or metrics during the training phase. Approximations of the cost functions are used because the scores or outputs generated by learning systems are generally real numbers, while many cost functions, such as WTA, are not differentiable and do not vary smoothly, when viewed as functions of those numbers. This can be seen within the context of ranking documents retrieved based upon a given query. The documents resulting from the query are ranked based upon the learning system score generated for each document and the input query that produced the document, called the query document pair. If the scores for two query document pairs are close in value, a small change in the scores can reverse the order of ranking of the documents. This can have a large affect with respect to the cost function used to evaluate the machine performance. For example, when using a WTA cost function, if the correct answer moves down just one position in the ranking order and is replaced in the top position by an incorrect answer, the learning system receives no credit. This discontinuity makes it difficult for the learning system to improve performance.

Because of this limitation of machine learning methods, many conventional information retrieval and question answering systems employ heuristics for ranking. However, using heuristics will generally give worse results than using the correct cost function, if the latter were possible. This has been observed, for example, by noting that in some cases, improving the system using the heuristic, does not improve the true cost. In addition, training of machine learning systems is further complicated when the number of documents returned for a query is variable. Therefore, the methods used during the training phase are generally approximations of the cost functions used to evaluate the learning systems rather than the actual cost functions used to evaluate performance during testing of the learning system.

One exemplary approximation for a cost function is pair-wise training. During the pair-wise training, the learning system is presented with a pair of results (e.g. document A and document B), where one of the documents is desired to be ranked higher than the other document. A cost function is used to update the learning system depending upon the learning system's outputs for both documents. For example, suppose that document A and document B are presented to the machine and it is desired that document A rank higher than document B. If the machine outputs a lower number for document A than it does for document B, then the cost will be large, and the parameters or weights of the machine are updated accordingly. The system tries to minimize the number of pair-wise errors in the results, where a pair-wise error occurs when two document in the list are ranked in the wrong order. Pairwise error is an example of a cost function that depends on structured output (because it depends on all the sorted documents or data) and is not smooth (because a tiny change in scores can result in a fixed, finite change in cost). Pairwise error can be approximated by a smooth function. In the following, for exemplary purposes, we will assume that a smooth approximation to pairwise error is being used.

The following example illustrates the problem of using pair-wise training as an approximation of WTA. A training query returns 1,000 documents including two relevant documents $D_1$ and $D_2$ as well as 998 irrelevant documents. The machine initially ranks $D_1$ in position 1 and $D_2$ in position 1000. The learning system can reduce the pair-wise error for the query by 996 errors by moving $D_2$ up to position 3 and by moving $D_1$ down to position 2, which may be required if the learning system does not have the capacity to place $D_1$ and $D_2$ in positions 1 and 2. Limitations on learning system capacity include memory limitations, computational power limitations or the like. However, the same movements will cause the WTA cost function to decrease from one, a successful result, to zero, an unsuccessful result. A huge decrease in the pair-wise error rate has resulted in the maximum possible increase in the WTA error or cost.

In general, finding a smooth cost function that has the desired behavior is very difficult. As seen in the example above, it is much more important to keep $D_1$ in the top position than to move $D_2$ up 997 positions and $D_1$ down one position; the optimal WTA cost is achieved when either $D_1$ or $D_2$ is in the top position. In this case, a better approximation to WTA would be to steeply discount the cost of errors that occur in the lower positions of the rankings, while maintaining higher cost values for errors that occur in the top positions of the rankings. Still allowing nonzero cost for documents that are low in the rankings allows those documents to gradually move up, as training proceeds. Note that this discrepancy between using pairwise error, and WTA, arises in this example because the learning system does not have the ability to put both documents in the top two positions; but finite capacity is a property of any learning system that will have good generalization performance.

Now assume that the function C is a smooth approximation to a cost function that accomplishes the above and that the learning system produces a ranking for a given query where $D_1$ is in position 2 and $D_2$ is in position 1,000, then if the score for a given document i is $s_i$, the partial derivative of the cost function C with respect to $s_1$ should be much greater than the partial derivative of C with respect to $s_2$:

$$\left|\frac{\partial C}{\partial s_1}\right| >> \left|\frac{\partial C}{\partial s_2}\right|$$

Here, a desired property of the cost function is captured by imposing a constraint on the derivative of the cost function. The task of specifying the cost function itself can be replaced by the task of specifying the derivative of the cost function with respect to each score, $s_i$, for each query. These derivatives can then be used to train the learning system using gradient descent, just as the derivatives of the cost function would normally be used. The key is that given an instance of a query and its ranked documents, it is much simpler to specify how a set of ranked documents should move to reduce a non-differentiable cost than it is to specify a smooth approximation of the multivariate cost function. Difficulty in approximating a cost function arises because the cost function can be a function of a variable number of arguments. For example, different numbers of documents can be served up for different queries, as is often the case in information retrieval. In addition, the cost function can be a function of a large number of parameters. Some of the parameters may have real number values, such as the score for each document, and some parameters may have integer values, such as the rank and label of each document.

A set of proposed gradients, referred to herein as "estimated gradients," that correspond to the documents can be generated and used to reduce the cost. The estimated gradient for each document should reflect the direction the document should move within the ranking in order to reduce cost and how strongly the document should be moved. A set of estimated gradients can be generated based upon the structured data output by the learning system and stored (e.g., in a lookup table) for use in updating the learning system parameters. Note that these estimated gradients are not actual gradients of the cost function, because such gradients will not exist, when the cost function is not differentiable, as is the case for pairwise error, WTA, NDCG and MRR. The appropriate estimated gradient can be obtained and applied to a document based upon a set of rules that reflect the requirements of the cost function. For example, the estimated gradient can be retrieved from a lookup table based upon such rules. Alternatively, the estimated gradient can be generated at the time of application to the document.

Figure 3:
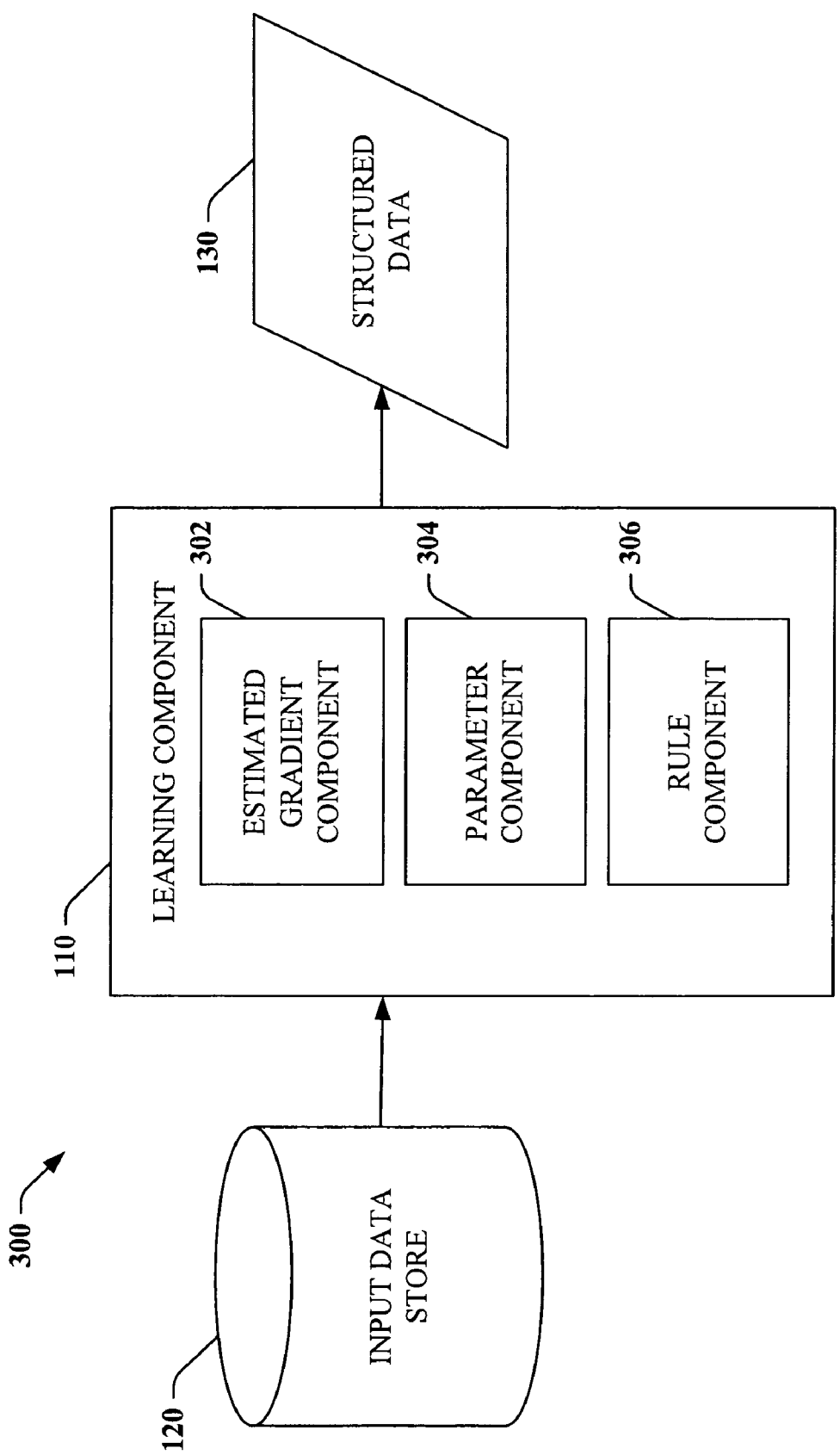
FIG. 3 is an illustration of a system for generating structured data in accordance with an aspect of the subject matter disclosed herein.

FIG. 3 is an illustration of a system 300 for generating structured data retrieval in accordance with an aspect of the subject matter disclosed herein. The system 300 includes a learning component 110, an input data store 120 and a set of structured data 130. The learning component 110 can include an estimated gradient component 302, a parameter component 304 and a rule component 306. The estimated gradient component 302 can store a set of proposed or estimated gradients based upon the requirements of the cost function to be used by the learning component 110. The set of estimated gradients can be predetermined and stored in a lookup table for retrieval and use during the training phase. The estimated gradients can be determined based upon a set of rules that reflect the requirements of the cost function. This set of rules can be stored in the rule component 306. The parameter component 304 can utilize the estimated gradients stored in the estimated gradient component 302 to update the parameters of the learning component 110 during the training phase. The estimated gradients may be generated or selected for use by the parameter component 304 based upon structured data 130 resulting from prior data processing.

Figure 4:
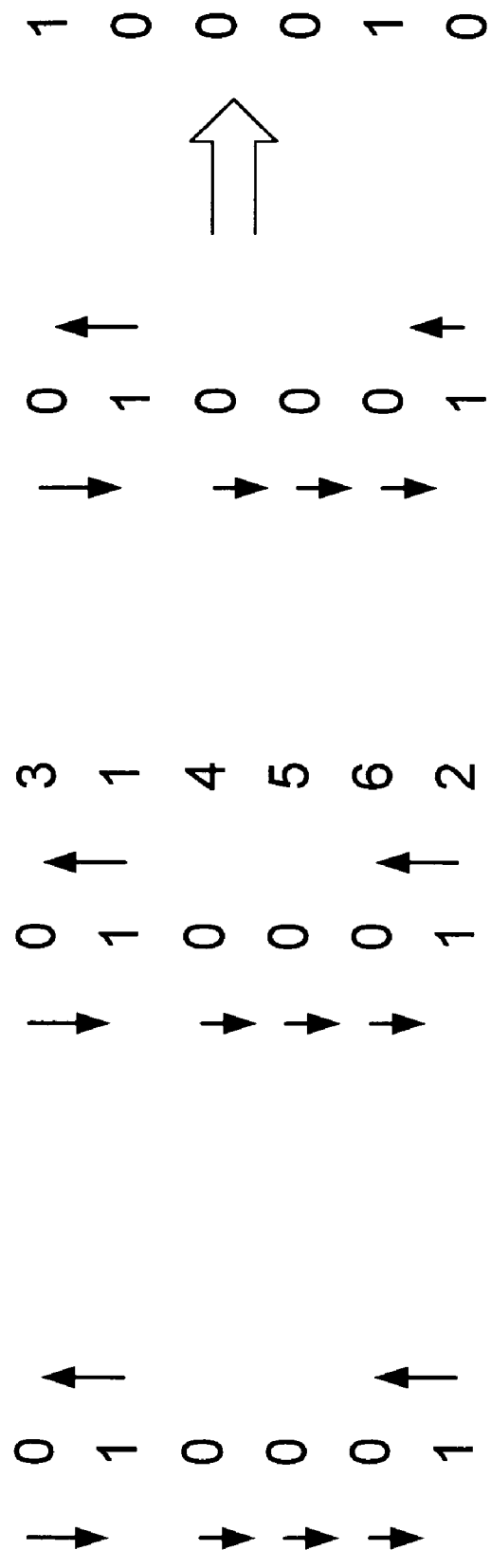
FIG. 4A is an illustration of an exemplary ranking of a set of documents.
FIG. 4B is an illustration of an exemplary ranking of a set of documents.
FIG. 4C is an illustration of an exemplary ranking of a set of documents.

Referring now to FIG. 4A, the relationship between the cost function, its derivative and the parameters of a learning system is illustrated using a specific, exemplary set of ranked results. FIG. 4A illustrates a sample ranking of six documents. Here, the documents are ranked from top to bottom in the figure. The document contents are represented by either a zero or a one. A '1' indicates that the document contents are relevant, while a '0' indicates that the document contents are not relevant. Consequently, in an optimal ranking of the documents the top two positions in the ranking would be occupied by the documents represented by '1', followed by the documents represented by '0'. The direction of the arrow next to each document in the figure indicates the direction that each document should move to reduce the cost and thereby improve the ranked results. The size of the arrow is indicative of how strongly the document should move in the indicated direction.

For this example, the ranking function can be denoted by $F_W(x)$. Here, x is a feature vector. A feature vector is a series of numbers for query document pairs derived from the attributes of both the query and the document. Alternatively, the feature vector can be derived solely from the attributes of the document. A weight vector is represented by w. Feature vectors are frequently used to sort or rank documents. The weight vector is a set of parameters that specify the behavior of the learning system. For example, for a neural network the weight vector represents a set of weights or coefficients attached to links joining the nodes of the neural network, and also to 'offset' parameters attached to each node.

The cost function for this example can be denoted by $C(y_1, \ldots y_6; l_1, \ldots l_6)$. Here, the cost is dependent upon a score generated by the learning system represented here by y, where $y_i = F_w(x_i)$. For example, $y_1$ represents the score generated by the learning system for the first ranked document; $y_2$ represents the score generated by the learning system for the second ranked document, and so on. The cost function is also dependent upon the label, represented here by $l_1, \ldots l_6$. Labels indicate the quality of the ranking. Labels can be text strings, such as "Excellent," "Good" or "Poor" or as illustrated in the figures as '0' or '1.'

FIG. 4B illustrates the desired ranking of the documents. Here, the two documents denoted by '1' would be moved into the first and second positions in the ranking. The document denoted by '0' currently in the first position is relegated to the third position and all of the other documents denoted by '0' are moved down one position within the ranking. While a smooth cost function required to effectuate the desired movements may not be known, it is clear that to achieve this ranking, the ranking function of the learning system, $F_w(x)$, should generate a large value for $F(x_1)$, a slightly smaller value for $F(x_2)$ and a considerably smaller value for $F(x_4)$. The value of $F(x_1)$ using an adjusted set of weights can be written as follows:

$$F_{w+\delta w}(x_1) = F_w(x_1) + \sum_i \delta W_i \frac{\partial F(x_1)}{\partial W_i}$$

Here $W_i$ represents original weights, or parameters, of the learning system, and $W_i + \delta W_i$ represents the weights after a small change. The weights can be selected as follows:

$$\delta W_i = \varepsilon \frac{\delta F(x_1)}{\delta W_i}$$

The above description is a very basic description of how gradient descent works, as will be recognized by those familiar with optimization techniques. Here, $\varepsilon$ represents a small learning rate. The learning rate can be a constant. Alternatively, the learning rate can be distinct for each weight. The gradient indicates both the direction and amount that a document should move within the ranking. The gradient is computed for each document. The sign of the gradient indicates the direction the document should move within the ranking and the size of the gradient indicates how strongly the document should move in a given direction. It may not be possible or practical to compute the gradients. Instead, the scores of the current function $F_W$ can be computed and sorted to obtain the ranking that the current system would give to the documents. Then, by focusing on the desired movement of the results, an estimated gradient, denoted by $\lambda_i$ can be attached, to each document. So, for the example illustrated in FIGS. 4A and 4B:

$$\delta W_i = \sum_{j=1}^{6} \delta W_i(x_j) = \sum_{j=1}^{6} \lambda_j \frac{\partial F(x_j)}{\partial W_i}$$

The changes to the parameters, $\delta W_i$, are based upon the estimated gradients, the gradients of F, and the current scores generated from the learning system. The estimated gradients, $\lambda_j$, depend upon the current output of the learning system for all documents $x_1 \ldots x_6$. So, $\lambda_j$ is a function of $F(x)$, e.g., $\lambda_j = \lambda_j(F_1 \ldots F_6)$. Given a set of the estimated gradients, there may exist a corresponding cost function, for which the estimated gradients are the actual gradients. The cost function corresponding to the estimated gradients is referred to herein as the estimated cost function C. Assuming that the cost function is a function of six arguments, as per the example illustrated in FIGS. 4A and 4B:

$$\frac{\partial C}{\partial W_i} = \sum_{j=1}^{6} \frac{\partial C}{\partial y_j} \frac{\partial F(x_j)}{\partial W_i}$$

Then, the estimated cost function should satisfy the following formula:

$$-\varepsilon \frac{\partial C}{\partial y_j} = \lambda_j(F_1 \ldots F_6)$$

Note that this puts conditions on the functional form that the estimated gradients can take. If there is to be an actual function for which the estimated gradients are the true gradients: the estimated gradients should in fact be what is know in the field of multilinear algebra to be an 'exact form'.

The estimated gradients can be selected to reflect the desired results based upon the scores produced by the learning system and the labels. In this example, the labels indicate the position of the document in the ranking. In the example using the WTA cost function to evaluate six documents, a set of rules based upon the WTA cost function can be used to select the estimated gradients. The first rule can be written as follows:

if $l_1 = `1`\ \&\ F(x_{r=1}) - F(x_m) > \delta$, then $\lambda_j = 0 \forall j$.

Here, m is the index of the highest ranked '0' and δ is a fixed margin. Therefore, if the document in the first position is a '1' ($l_1 = `1`$) and the score for the first ranked document ($F(x_{r=1})$) less the score for the highest ranked '0' document $F(x_m)$ is greater than a fixed margin (δ), then set $\lambda_j$ equal to zero for every j ($\lambda_j = 0 \forall j$). In this case, the first document is in the correct position and the WTA cost function will produce a cost of one. In addition, the difference between the score of the document labeled '1' and the document labeled '0' is greater than the margin, ensuring that the document rankings are unlikely to be switched. Therefore, none of the documents should be repositioned and the estimated gradients should be set to zero.

The second rule is that any document with a label of '0' ($l_i = 0$) ranked above all of the documents with label '1', should be moved strongly down the ranked list of documents. To ensure that the document moves down the ranked list, the estimated gradient should be a negative number and to ensure that the document moves strongly down the list, the estimated gradient for the document ($\lambda_i$) should be set to a constant $-\lambda$ with a relatively large value.

Thirdly, for a top-ranked document with a label of '1', which is not the top-ranked document within the results, the document should move up strongly. Accordingly, to ensure that the document moves up the ranked list, the estimated gradient of the document ($\lambda_i$) should be set to a positive value. To ensure that the document moves strongly up the list, the estimated gradient should be set to a relatively large constant, $+\lambda$.

In addition, documents with labels of '0' located below a document with a label '1', should move down in the ranked list, but much more weakly. For example, the value of the estimated gradient may be set to half the value of the estimated gradient used to move documents labeled '0' out of the top positions (e.g., $\lambda_i = -\frac{1}{2}\lambda$). Similarly, documents with labels '1' that are not the top-ranked '1', should move up in the ranked list, but much more weakly. For example, the value of the estimated gradient may be set to half the value of the estimated gradient used to move the top ranked document labeled '1' toward the top position (e.g., $\lambda_i = \frac{1}{2}\lambda$).

FIG. 4C is an illustration of reordering using a set of estimated gradients generated using the rules discussed above. The top ranked document with a label of '1' is moved up strongly, as illustrated by the corresponding arrow. Similarly, the top ranked '0' is moved downward strongly. The remaining documents are moved up or down weakly depending upon their respective labels.

The training of a learning system can be further explained by looking at a specific example. For example, the learning component 110 can include a neural network. Neural networks are commonly used for classification and regression tasks. A neural network is commonly organized as a multi-layered, hierarchical arrangement of processing elements, also referred to as neurons, nodes or units. For the purposes of this disclosure, the terms neuron, node and unit will be used interchangeably. Each unit typically has one or more inputs and one output. Each input is typically weighted by some coefficient value. Each output of a unit is typically a result of processing its input value(s) in accordance with an activation function and any weight or bias applied.

In a hierarchical arrangement of neurons in a neural network, the neurons are usually arranged into layers. The output of a neuron in one layer can be an input to one or more neurons in a successive layer. Layers may be exposed in the sense that either the inputs of neurons in that layer directly receive input from a data source external to the neural network or the outputs of neurons are the desired result of processing. Layers may also be hidden in the sense that the inputs of units in that layer are computed using the outputs of units in a previous or lower layer, and the outputs of units in a hidden layer feed inputs for units in a successive or higher layer. An exemplary neural network can include any suitable number of layers such as an input layer, an intermediate or hidden layer and an output layer.

The use of a neural network typically involves a training phase and a testing phase. During the training phase, one of a preselected group of data patterns called the 'training set' is presented to the network for classification. This process is often referred to as forward propagation. An objective of the training step is to minimize the cost function, thereby minimizing errors in the network. Results from the training are then used to adjust parameters of the network, such as weights or biases, in such a way that, if that pattern were presented for forward propagation again, the network would yield a lower cost. This adjustment process is referred to as backward propagation. Forward propagation and backward propagation are usually performed successively until the cost function, averaged over a suitable, second preselected group of data patterns called a 'validation set', is minimized.

When training is completed, the parameters of the network are frozen and can no longer be changed. At that point, the network is said to be fully trained. A test data set is presented to the network and the results of computation on that test set are evaluated and compared with a known ideal result. If that evaluation yields a result that is within an acceptable margin, the network is accepted for use.

Figure 5:
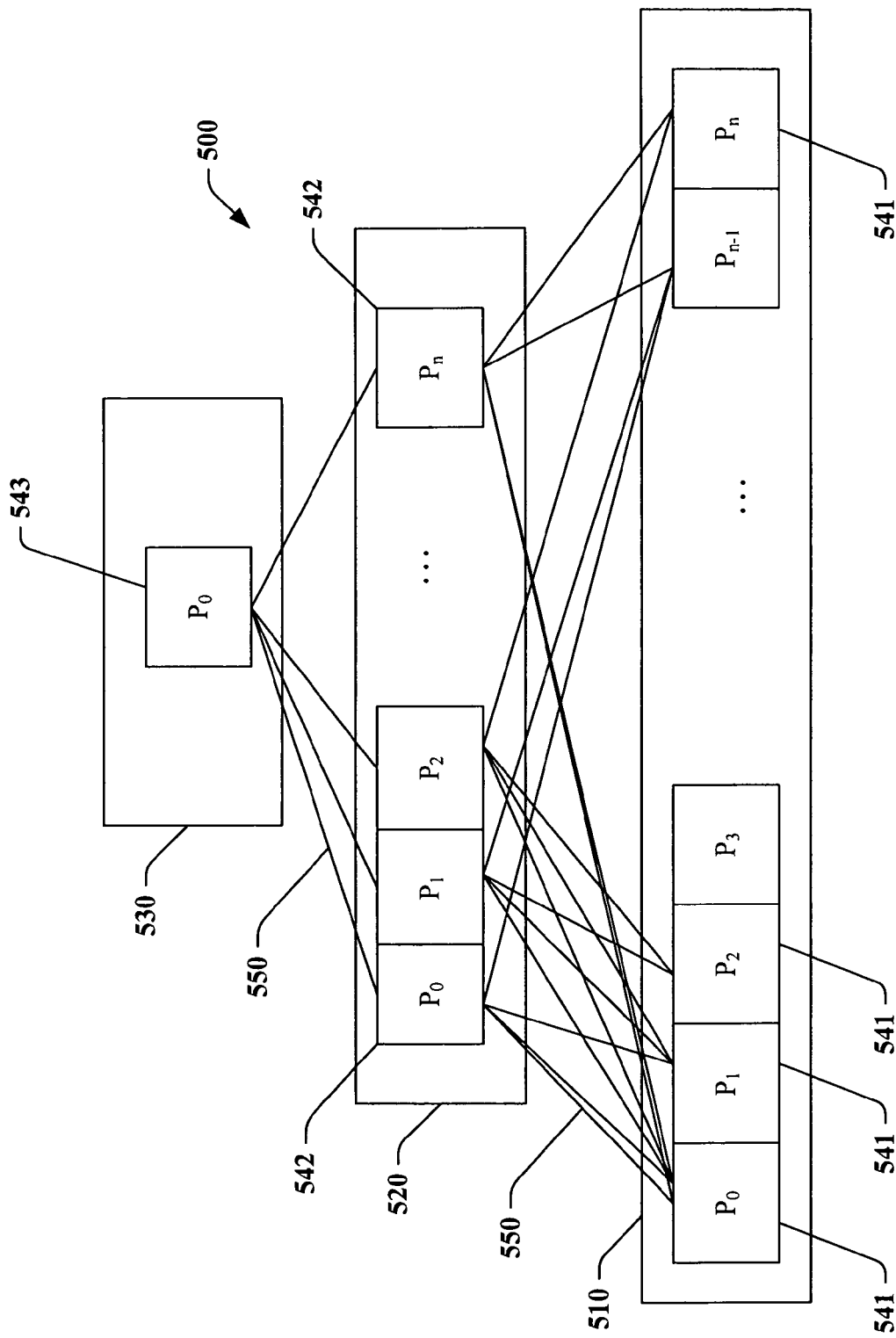
FIG. 5 is a system block diagram of a multi-layer neural network.

FIG. 5 is a system block diagram of a multi-layer neural network 500 that can be used to implement the learning component 110. The neural network 500 depicted includes an input layer 510, a hidden layer 520 and an output layer 530. Each layer includes one or more neurons 541, 542, 543 that each accept an input; process that input with respect to some predefined function and optional weight or bias; and provide an output. The units in each layer are connected to each other via a number of connections 550. In the example depicted, each layer is fully connected with adjacent layer(s), meaning that each unit in that layer is connected to every unit in the layer(s) adjacent to the layer in which that unit resides. For presentation clarity, some units and some connections have been omitted from the figure. It should be appreciated that the exact number and configuration of units in the neural network is an implementation detail within the level of skill of the ordinary artisan in this area and that the specific configuration depicted in FIG. 5 and discussed herein should not be taken as a limiting factor.

The input layer 510 is the layer that initially receives input data to be ranked. Typically, the input data is structured such that a number of attributes of interest are defined and each attribute has an associated value. A common, and in many cases preferred, configuration of the input layer 510 is for that layer to have a number of units equal to the number of attributes of interest of the data to be processed. Each unit 541 in the input layer 510 will then process a single attribute of the input data and feed the results of its processing forward to the units 542 of the hidden layer 520. Typically, the units in the input layer do not have associated biases or weights, whereas every other unit in the network does. Similarly, the units 542 of the hidden layer 520 will process data input to them from the units 541 of the input layer 510 and feed results of their processing forward to the units 543 of the output layer 530. The units 543 of the output layer 530 similarly process their respective input data and output results.

Figure 6:
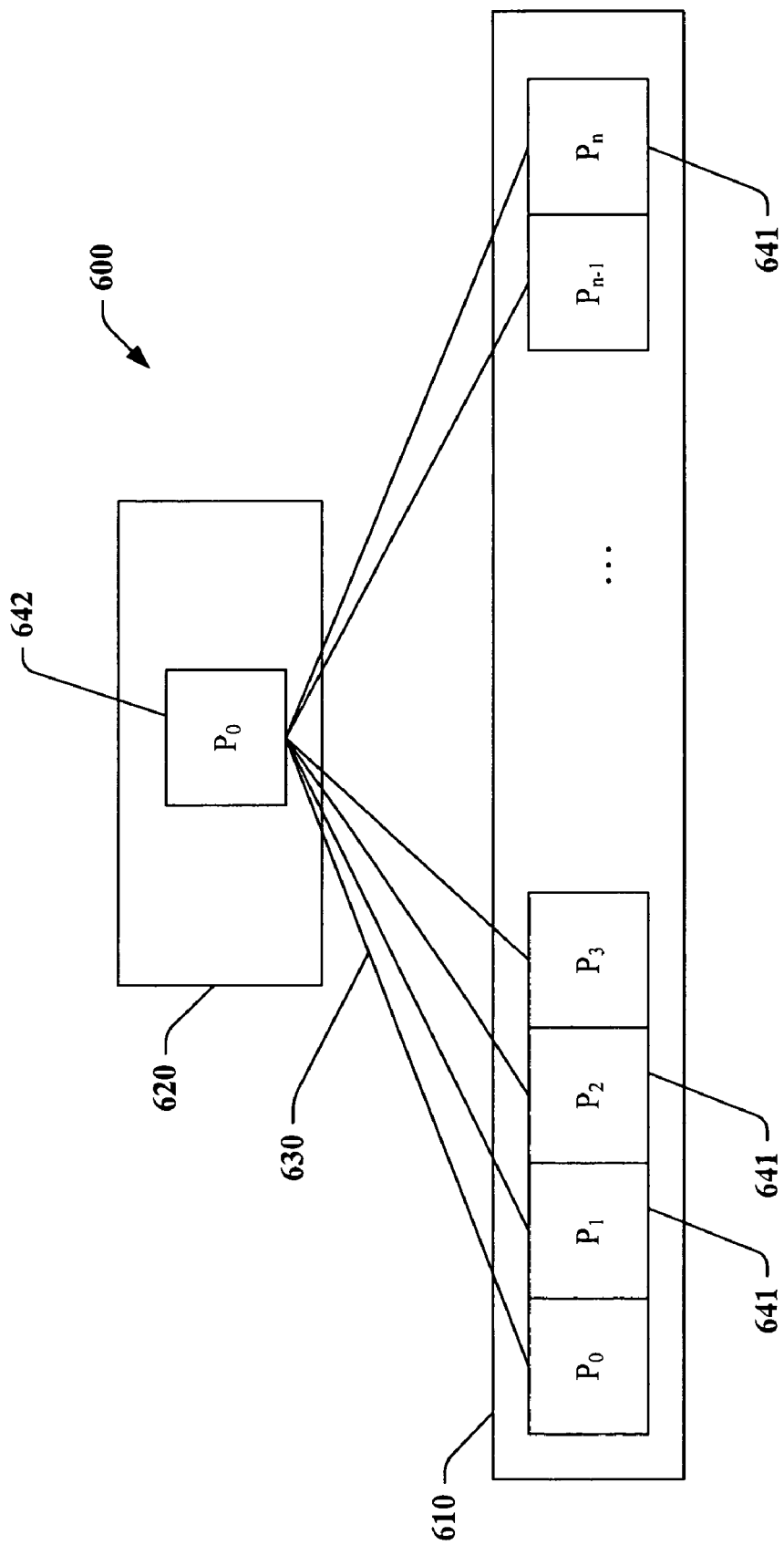
FIG. 6 is a system block diagram of a single-layer neural network.

Referring now to FIG. 6, an embodiment of a single-layer neural network 600 is illustrated in system block diagram form. The neural network 600 depicted includes an input layer 610 and an output layer 620. The name single layer is derived from the single layer of connections 630 between the input layer 610 and the output layer 620. As in the multi-layer neural network, each layer includes one or more neurons 641 and 642 that each accept an input; process that input with respect to some predefined function and optional weight or bias; and provide an output. The units in each layer are connected to each other via a number of connections 630. The input layer 610 is the layer that initially receives input data to be ranked. Typically, the input data is structured such that a number of attributes of interest are defined and each attribute has an associated value. A common, and in many cases preferred, configuration of the input layer 610 is for that layer to have a number of units equal to the number of attributes of interest of the data to be processed. Each unit 641 in the input layer 610 will then process a single attribute of the input data and feed the results of its processing forward to the unit 642 of the output layer 620. The unit or units 642 of the output layer 620 process their respective input data and output results.

In the case of a learning system ranking query search results, attributes or feature vectors may be derived from both the query and a search result (e.g. a document). Each feature vector may be a set of numbers dependent upon certain attributes, for example, the words in the query, the titles of the results, the number of occurrences of certain words in the results and any other features of the query or the results. A feature vector is the result of a single query document pair.

Figure 7:
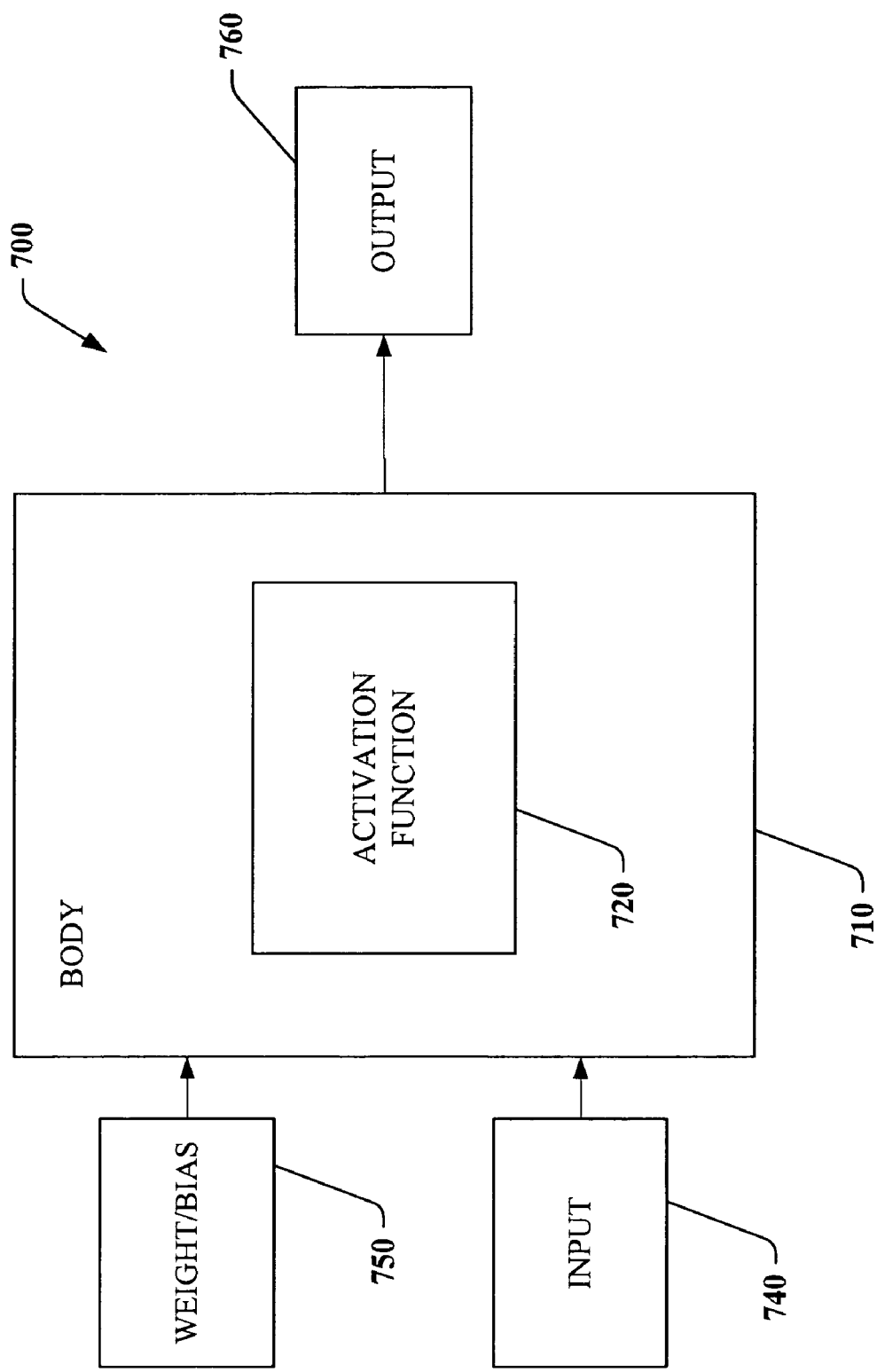
FIG. 7 is a system block diagram of a unit of a neural network.

Turning now to FIG. 7, a sample unit 700 is depicted in system block diagram form. The unit 700 includes a body 710 that performs data processing in accordance with a predefined process. Usually that process is in the form of an activation function 720. Specific activation functions that may be employed are largely a matter of implementation choice but are typically some form of sigmoidal function.

An input 740 feeds data into the body 710 for processing in accordance with its predefined functions. A weight or bias 750, also referred to as the parameter, is also depicted as an input into the body 710 of the unit 700, although other weighting or biasing means may be used, such as a variable within the body 710 of the unit 700. An output 760 is the result of passing the summed inputs and bias through the activation function.

As mentioned, specific activation functions employed are largely a matter of implementation choice in any given application. It is possible for each and every unit in a neural network to have a unique activation function. However, it is typical for units within the input and hidden layers to have the same activation function and to use different functions for the output layer. Again, whether to use different functions is primarily an implementation choice.

To construct and configure a neural network of the type discussed, a number of factors are considered. Appropriate activation functions and thresholds are created or selected. Input data formats are defined. The number of units and layers is determined, along with interconnection topologies for those units and layers. When construction is completed, the network is trained and tested.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
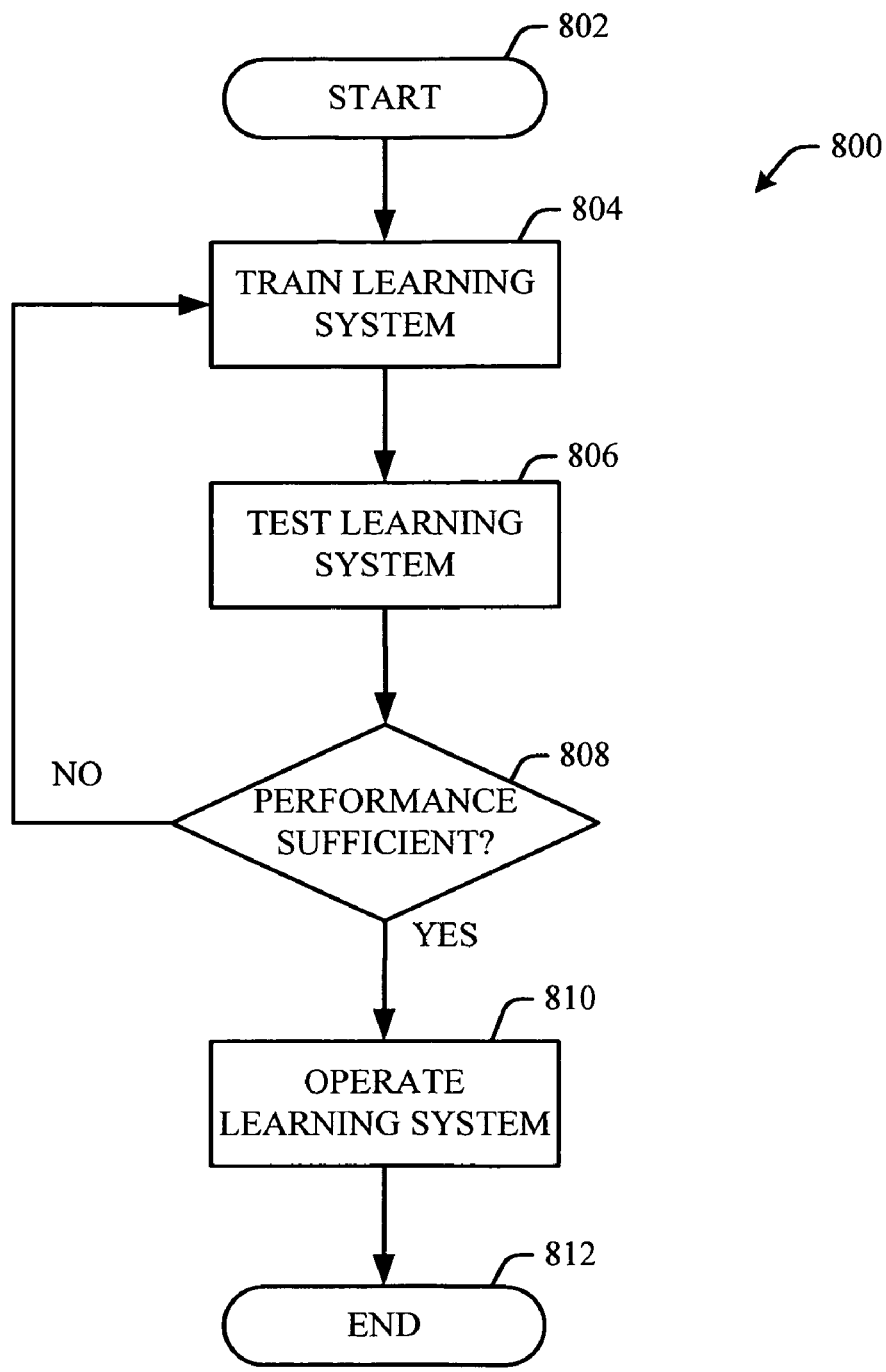
FIG. 8 is an illustration of a method of preparing a learning system for operation in accordance with an aspect of the subject matter disclosed herein.
Figure 9:
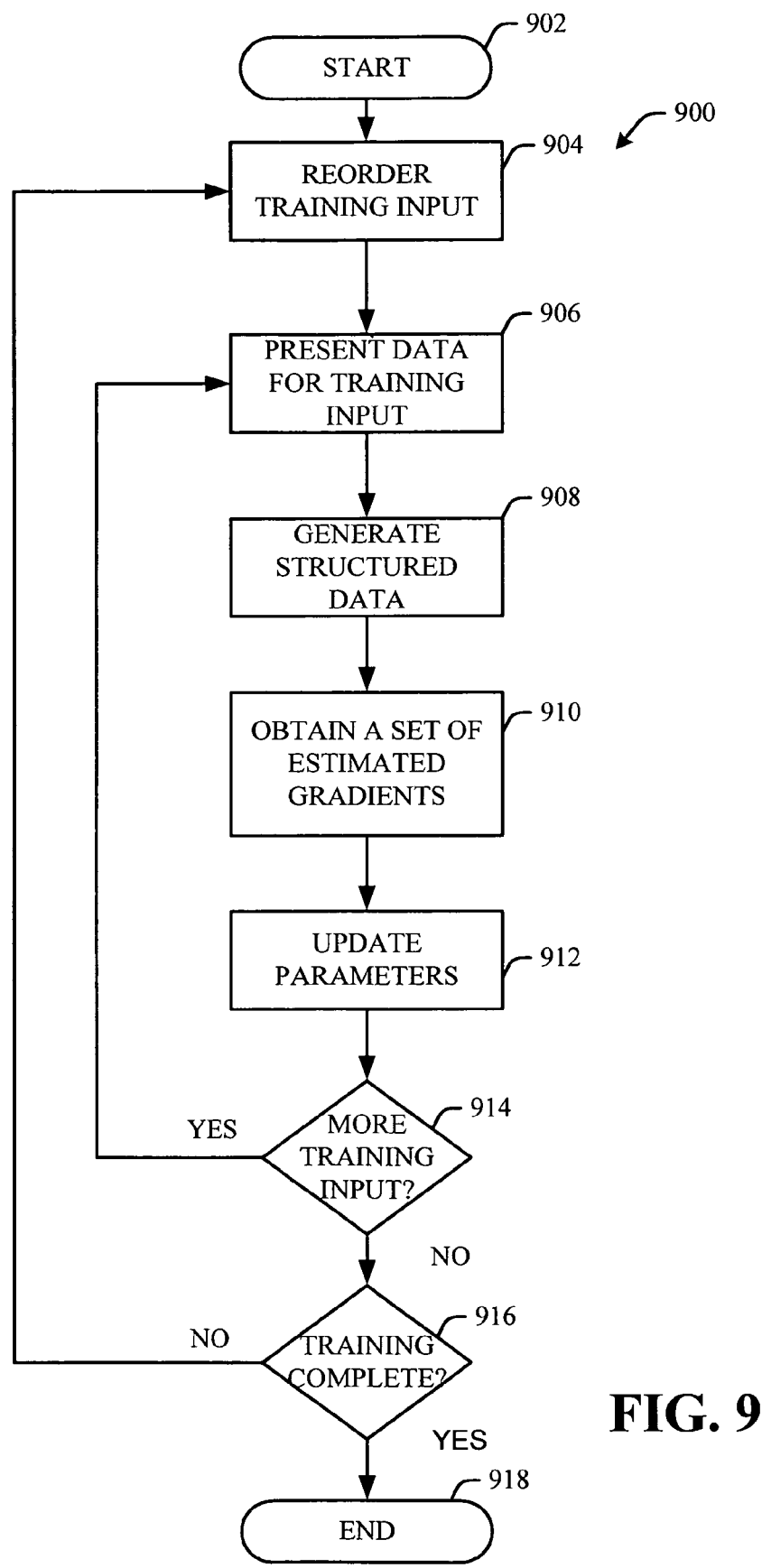
FIG. 9 illustrates a method for training a learning system with an arbitrary cost function, in accordance with an aspect of the subject matter disclosed herein.
Figure 10:
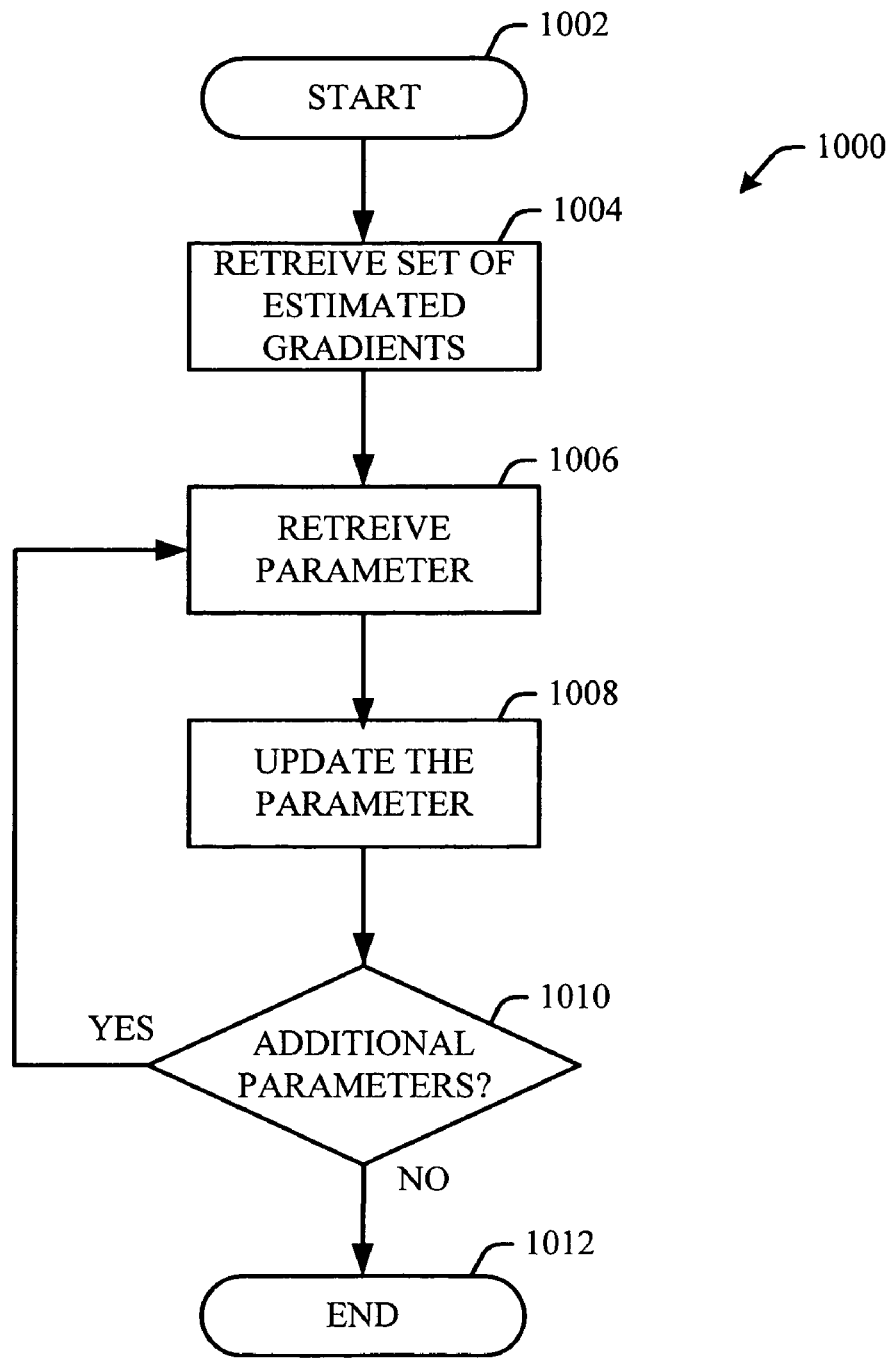
FIG. 10 illustrates a method for updating machine learning system parameters.

In view of the exemplary systems described supra, methodologies that may be implemented in accordance with the disclosed subject matter will be better appreciated with reference to the flowcharts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier or media.

FIG. 8 illustrates a method 800 for preparing a learning system for operation. Processing begins at the START block 802 and continues to process block 804 where the learning system is trained. At process block 806, the learning system is tested using validation data. At decision block 808, a determination is made as to whether the performance of the learning system over the validation data is sufficient. If the performance is insufficient, the processing returns to process block 804 and the learning system continues training. If the performance of the learning system is sufficient, processing continues to process block 810 where the learning system enters the operational phase and can be utilized by users. The operating parameters of the learning system can be fixed prior to entering into the operational phase. The process terminates at block 812.

FIG. 9 illustrates a method 900 for training a learning system with an arbitrary cost function. The method is described with respect to a ranking system utilizing a neural network. However, the method is not limited to ranking systems including neural networks. Processing begins at START block 902 and continues to process block 904 where the training input is reordered. In particular, the set of queries that make up the training set are shuffled. Shuffling refers to a procedure during which queries within the set are reordered before being presented to a neural network. It is often useful to shuffle queries in this fashion prior to beginning a training epoch because such shuffling can assist in convergence. At process block 906, input data is presented to the learning system for a given training input. In this example, for a given query, a set of query document pairs is presented to the learning system. Alternatively, a set of feature vectors is presented to the learning system. Each feature vector can be computed (for a given query) from the query/document pair (that is, some features will depend, in general, on both the query and the document). The set of query document pairs includes each document to be ranked, for that given query. At process block 908, the output of the learning system is used to generate the structured data. In this example, the ranking of each of the documents is determined.

An estimated gradient for each document is obtained based upon the structured data (e.g., rankings of the documents) at process block 910. The estimated gradient indicates amount and direction that the learning system output should be adjusted. The estimated gradients can be selected based upon a set of rules to reflect the cost function that will be used to test the learning system. For example, for WTA cost function the estimated gradient for the top ranked result may be significantly larger than the estimated gradient for the rest of the results. However, utilizing large estimated gradients may cause problems resulting in flipping, where document ranks reverse for successive queries. The set of estimated gradients should be selected so that there is a significant gap or margin between the top ranked result and the next ranked result. Accordingly, the estimated gradients may be chosen to vary smoothly.

At process block 912, each of the parameters or weights of the learning system is updated based upon the set of estimated gradients. The changes to the learning system parameters can be calculated for the input data from each training input and updated based upon the input data for all of the training input. In this example, the change in the weights may be calculated for each query document pair. However, the weights are not actually modified until all the query document pairs are processed, because the values of the estimated gradients themselves depend on those weights. As a result of this batch processing, the change in the weights depends on every query document pair in the list. Since the estimated gradients can depend on every document's score, label and rank, the learning system can model much more complicated dependencies than if the estimated gradients were computed for some simple cost function, such as a classification cost function, which depends only on a single document's score.

At decision block 914, a determination is made as to whether there are additional queries in the training set. If there are additional queries, the processing returns to process block 906 and the next query in the training set is processed. If all of the queries in the training set have been processed, processing continues to decision block 916. At decision block 916, the performance of the learning system is evaluated to determine whether to continue training and return to process block 904 or terminate at block 918. In one embodiment, the performance is evaluated based upon the rate of change of the mean error rate on the training set.

FIG. 10 illustrates a method 1000 for updating learning system parameters. Processing begins at START block 1002 and continues to process block 1004 where the set of estimated gradients is retrieved. Next, at processing block 1006 the current value for a parameter for the learning system is retrieved. The parameter is updated at processing block 1008 based upon the set of estimated gradients and the scores output from the learning system for each document or result.

At decision block 1010, a determination is made as to whether there are additional parameters to be updated in the learning system. If so, the process returns to processing block 1006 and the current value for the next parameter is retrieved. If there are no additional parameters to be updated, the process terminates at block 1012.

Figure 11:
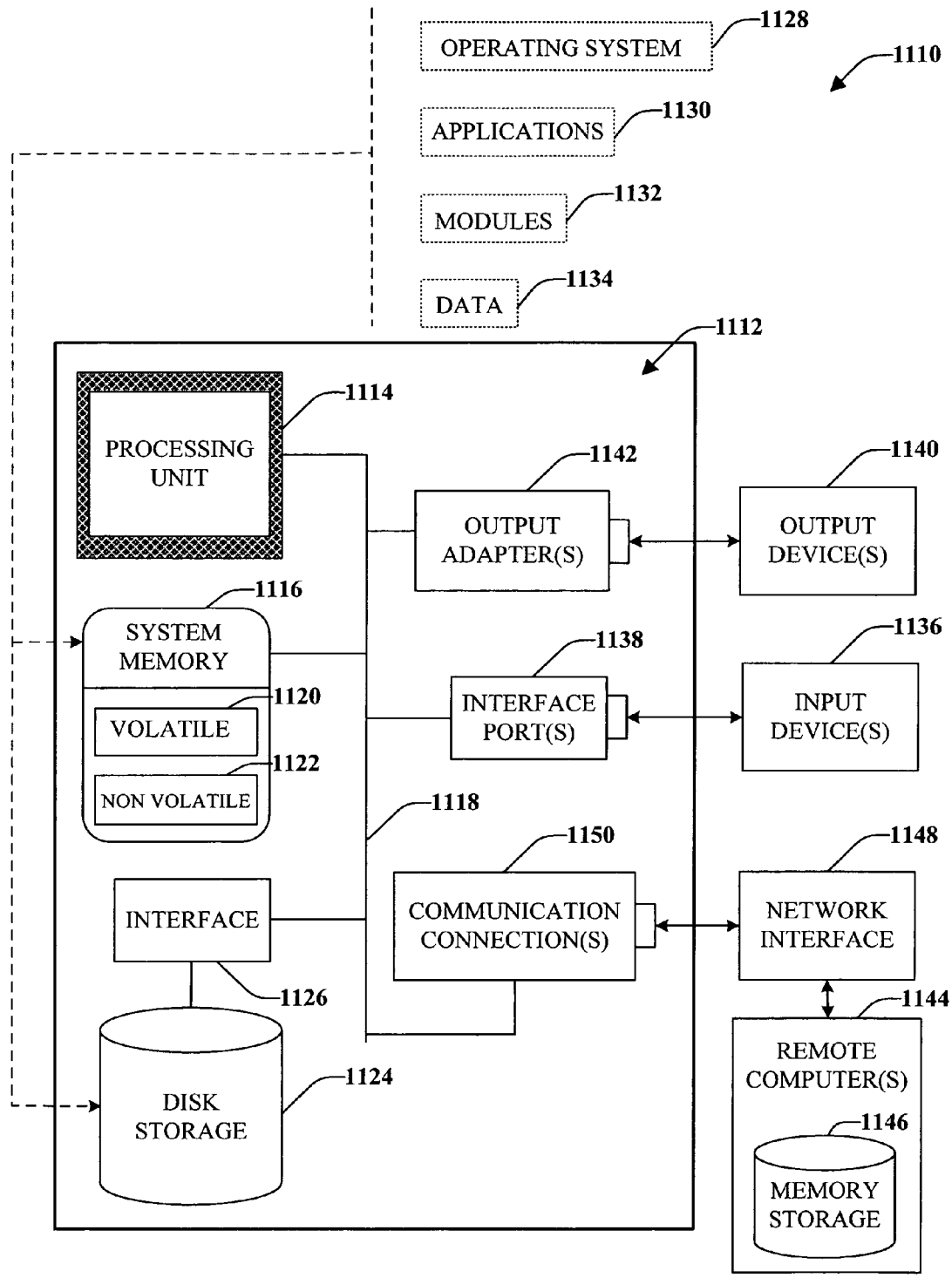
FIG. 11 is a schematic block diagram illustrating a suitable operating environment.
Figure 12:
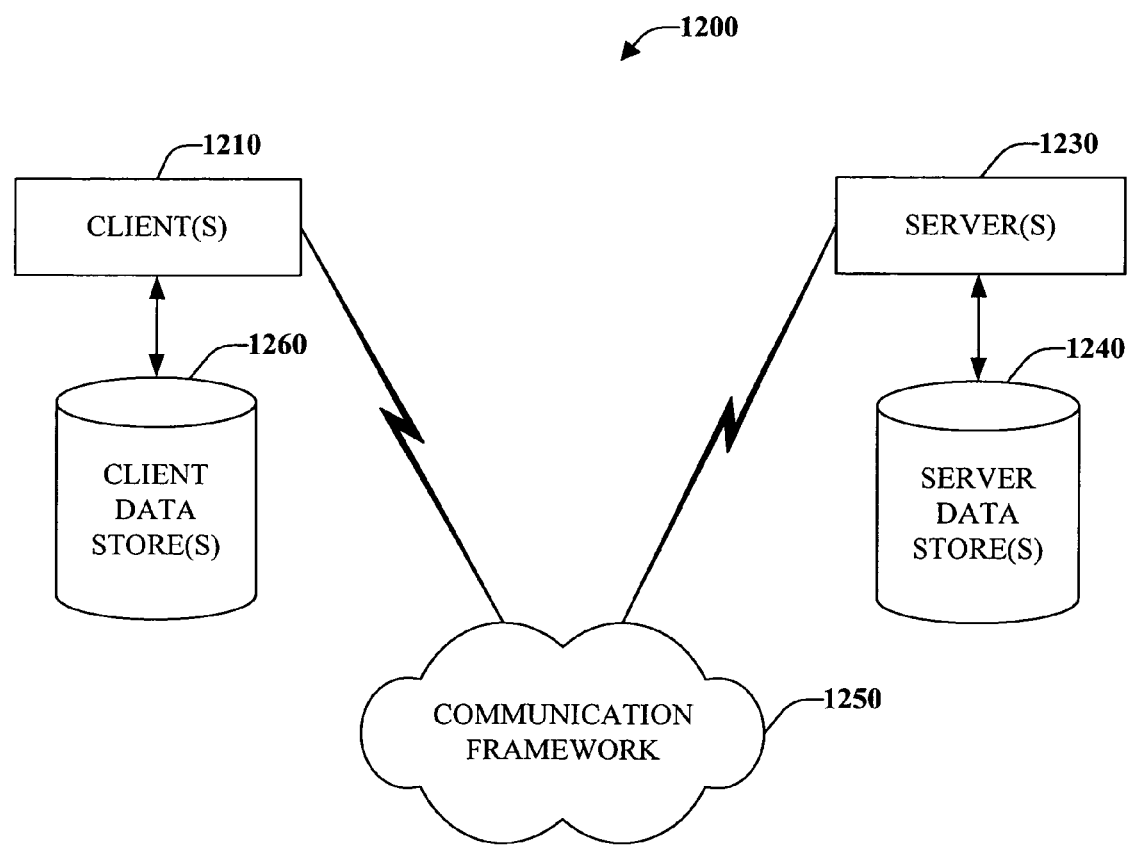
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed system and methods also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present system and methods can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the disclosed system can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer-implemented method for training a machine learning system to structure data in accordance with a non-differentiable cost function, comprising:
receiving a set of input data from a data store, the set of input data is returned as a result of a search query and comprises at least one of one or more web pages, one or more text files, one or more images, one or more audio data files, video data or word processing files;

obtaining at least one estimated gradient based at least in part upon the structured data and at least one requirement of the cost function, wherein the estimated gradient indicates an amount and direction of adjustment of the learning system output;

updating at least one parameter of the machine learning system based upon the at least one estimated gradient; and generating from the learning system structured data comprising updated rankings for the input data based at least on the one updated parameter.

2. The method of claim 1, further comprising developing at least one rule for obtaining estimated gradients based upon the non-differentiable cost function, the at least one rule is used in obtaining the at least one estimated gradient.

3. The method of claim 1, further comprising testing the machine learning system to determine whether to continue training the system.

4. The method of claim 1, the machine learning system is a neural network.

5. The method of claim 4, the neural network is a single-layer neural network.

6. The method of claim 1, the machine learning system comprises a differentiable function.

7. The method of claim 1, the cost function is at least one of winner take all (WTA), normalized discounted cumulative gain measure (NDCG), mean reciprocal rank (MRR), area under a ROC curve, mean average precision and pair-wise error count.

8. A machine learning system that structures data in accordance with a non-differentiable cost function, comprising a computer processor for executing the following components, the system comprising:

a learning component that generates structured data from input data wherein the structured data comprises documents ranked by the learning component based on at least one updated parameter;

an estimated gradient component that obtains at least one estimated gradient based at least in part on structured data resulting from prior data processing and on the non-differentiable cost function, wherein the estimated gradient indicates an amount and direction of adjustment of the learning system output; and a parameter component that updates at least one parameter of the machine learning system based at least in part on the at least one estimated gradient.

9. The system of claim 8, further comprising a rule component that contains at least one rule for obtaining estimated gradients based upon at least one requirement of the cost function.

10. The system of claim 8, further comprising an estimated gradient data store that contains the values of the at least one estimated gradient.

11. The system of claim 8, the learning component is a neural network.

12. The system of claim 11, the neural network is a single-layer neural network.

13. The system of claim 8, the learning component comprises a differentiable function.

14. The system of claim 8, the input data includes at least one of one or more web pages, one or more text files, one or more images, one or more audio data files, video data or word processing files.

15. The system of claim 8, the cost function is at least one of winner take all (WTA), normalized discounted cumulative gain measure (NDCG), mean reciprocal rank (MRR), area under a ROC curve, mean average precision and pair-wise error count.

16. A system comprising computer processor for executing the following software components, for training a machine learning system to structure data in accordance with a non-differentiable cost function, comprising:

means for generating structured data from a set of data objects input from a data store wherein the structured data comprises documents returned as a result of a search query, ranked by the learning component based at least on at least an updated parameter;

means for obtaining at least one estimated gradient based at least in part upon the structured data and the non-differentiable cost function, wherein the estimated gradient indicates an amount and direction of adjustment of the learning system output; and means for updating at least one parameter of the machine learning system based upon the at least one estimated gradient.

17. The system of claim 16, further comprising means for developing at least one rule for obtaining estimated gradients based upon the cost function, the at least one rule is used in obtaining the at least one estimated gradient.

18. The system of claim 16, the machine learning system comprises a differentiable function.

19. The system of claim 16, the machine learning system is a neural network.

* * * * *

UNITED STATES PATENT AND TRADEMARK OFFICE
CERTIFICATE OF CORRECTION

| | | |
|---|---|---|
| PATENT NO. | : 7,472,096 B2 | Page 1 of 1 |
| APPLICATION NO. | : 11/305395 | |
| DATED | : December 30, 2008 | |
| INVENTOR(S) | : Christopher J. Burges et al. | |

It is certified that error appears in the above-identified patent and that said Letters Patent is hereby corrected as shown below:

In column 19, line 13, in Claim 1, before "one" insert -- at least --.

In column 19, line 46, in Claim 8, after "updates" insert -- the --.

In column 20, line 23, in Claim 16, after "comprising" insert -- a --.

Signed and Sealed this
Third Day of May, 2011

David J. Kappos
*Director of the United States Patent and Trademark Office*